United States Patent [19]
Huber

[11] Patent Number: 5,689,336
[45] Date of Patent: Nov. 18, 1997

[54] PHOTOELECTRIC POSITION MEASURING SYSTEM

[75] Inventor: Walter Huber, Traunstein, Germany

[73] Assignee: Dr. Johannes Heidenhain GmbH, Traunreut, Germany

[21] Appl. No.: 659,336

[22] Filed: Jun. 6, 1996

[30] Foreign Application Priority Data

Jun. 10, 1995 [DE] Germany .......................... 195 21 295.9

[51] Int. Cl.$^6$ ......................................................... G01B 9/02
[52] U.S. Cl. ...................... 356/356; 356/345; 250/237 G
[58] Field of Search ................................. 356/356, 345; 250/237 G

[56] References Cited

U.S. PATENT DOCUMENTS 5,428,445  6/1995  Holzapfel ................................. 356/356
5,648,658  7/1997  Holzapfel et al. ....................... 356/356

Primary Examiner—Frank G. Font
Assistant Examiner—Robert Kim
Attorney, Agent, or Firm—Brinks Hofer Gilson & Lione

[57] ABSTRACT

A scanning grating is provided in a photoelectric position measuring system which has three areas per graduation period (d) arranged behind each other in the measuring direction. These areas $B_1$, $B_2$, $B_3$ are structured transversely with respect to the measuring direction X in such a way that transversely diffracted light beams are directed on detectors $D_0$, $D_1$, $D_2$ which are arranged transversely to the measuring direction X. The detectors generate signals which are phase-shifted with respect to each other.

14 Claims, 4 Drawing Sheets

PHOTOELECTRIC POSITION MEASURING SYSTEM

FIELD OF THE INVENTION

The invention relates to a photoelectric position measuring system wherein light from a light source is modulated as a function of the position of a scale having a plurality of gratings which are displaceable with respect to each other. In the process, the light beams which are diffracted at the gratings interfere with each other and the phase-shifted interference signals are detected by means of a plurality of photodetectors.

U.S. Pat. No. 4,776,701 describes a position measuring system having a reflective scale grating disposed relatively displaceable with respect to a scanning grating. The scanning grating is embodied as a phase grating with a defined relationship between the bar widths and the groove widths in order to generate three electrical signals which are phase-shifted by 120° with respect to each other. A group of diffracted beams of the same direction is focused on each one of three downstream disposed detectors. These groups of diffracted beams of the same direction are also referred to as so-called resulting diffraction orders. The diffracted beams of the resulting nth diffraction order correspond to the group of beams which exit with respect to their direction from the total system of the two gratings in a way as if, except for the reflection at the scale, they had been deflected by only one grating of the nth diffraction order.

The scanning grating used is designed or dimensioned optically in such a way that the different diffraction orders correspond to the signals with the desired phase shift. In order to assure the spatial separation of the various signal portions at the detectors, the optical imaging device between the scanning grating and the detectors must have a defined minimum focal length. For a measuring system designed in this way with a graduation period T=20 μm and a wavelength of 880 nm, the focal length of the condenser is approximately 30 mm, which results in a relatively large structure of the scanning head.

Since the minimum focal length of the optical imaging device mentioned is approximately proportional to the graduation period of the graduations or gratings used, the problem of the structural size particularly results when it is intended to scan scales with coarser graduation periods by means of this measuring principle.

U.S. Pat. No. 4,677,293 describes a position measuring system having a scale that includes a transverse graduation which is scanned by a scanning plate with a screen structure. In this position measuring system, the transverse graduation consists of several strip-shaped diffraction elements which are disposed next to each other in the measuring direction and have grating bars extending parallel with the measuring direction. The individual diffraction elements differ with respect to their transverse graduation periods and therefore deflect an impinging light beam in different directions. If this transverse graduation is illuminated through the gaps in the scanning plate, deflected light beams are generated, whose angle of deflection is a function of the transverse graduation period and thus of the illuminated transverse grating area from which the scale position is derived. Light beams which have been differently deflected are focused by means of a lens on different photodetectors in the focal plane of the lens.

In these known position measuring systems, the generation of the signals modulated as a function of position takes place on the basis of the Moire principle, i.e. no evaluation of interfering partial light beams is provided for position determination.

U.S. Pat. No. 4,746,792 describes a position measuring system having a scale that also has areas arranged behind each other in the measuring direction with transverse graduations and reflecting or transparent areas. The transverse graduation areas are embodied as phase gratings whose grating parameters have been selected such that the 0th diffraction order generated is obliterated and all other diffraction orders do not impinge on the photodetector. Thus, the areas with transverse graduation are sensed as non-reflective or transparent areas by the photodetector, but do not act directionally selective with respect to several photodetectors present.

SUMMARY OF THE INVENTION

An object of the present invention is to provide a photoelectric position measuring system which is simply constructed and cost-efficient to produce. In this case the scanning principle known from U.S. Pat. No. 4,776,701, for example, should be capable of being used, i.e. signal generation is based on the interference of light beams which are diffracted at one or several graduated gratings. The option of scanning coarser graduation periods is particularly demanded, along with a compact structure of the scanning head at the same time.

An important advantage of the position measuring system in accordance with the present invention lies in that it is possible to generate scanning signals which are phase-shifted with respect to each other in a simple manner, wherein a longitudinal (i.e. in the measuring direction) separation of the resulting diffraction orders is no longer necessary. Because of this, a short focal length of the optical imaging device used is assured, and thus compact structure of the scanning head results.

It has furthermore been shown to be advantageous to generate position-dependent scanning signals by means of single-field scanning which are impervious to soiling and/or graduation errors of the scale. This relatively large tolerance of the scale graduation allows cost-efficient manufacture.

Furthermore, the position measuring system in accordance with the present invention assures sufficient insensitivity regarding the distance between the scale and scanning graduation.

DETAILED DESCRIPTION OF THE PRESENTLY PREFERRED EMBODIMENTS

Figure 1:
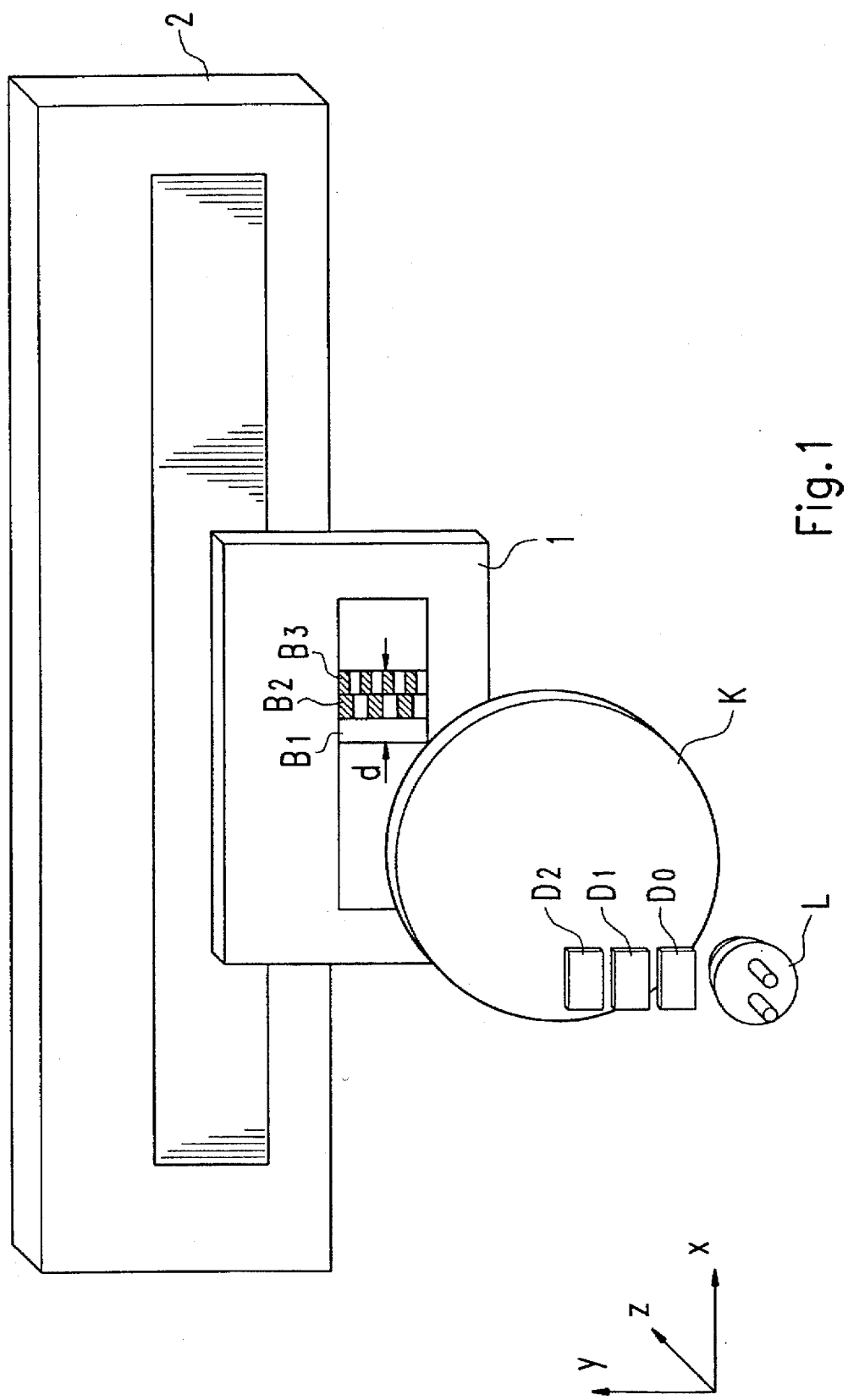
FIG. 1 is a schematic of the position measuring system to a preferred embodiment of according the present invention.

FIG. 1 is a schematic of a position measuring system according to a preferred embodiment of the present invention. The position measuring system 10 includes a light source L, collimator lens K, phase grating 1, scale grating 2 and photodetectors $D_0$, $D_1$, $D_2$. The phase grating 1 has a defined graduation period d. The phase grating 1 and scale grating 2 are displaceable with respect to each other in the measuring direction X. Phase grating 1 is preferably embodied as a scanning grating with a defined transverse structure for generating several scanning signals that are phase shifted with respect to each other and are position-dependent when the scale grating 2 and the scanning grating 1 are displaced relative to one another.

Figure 3:
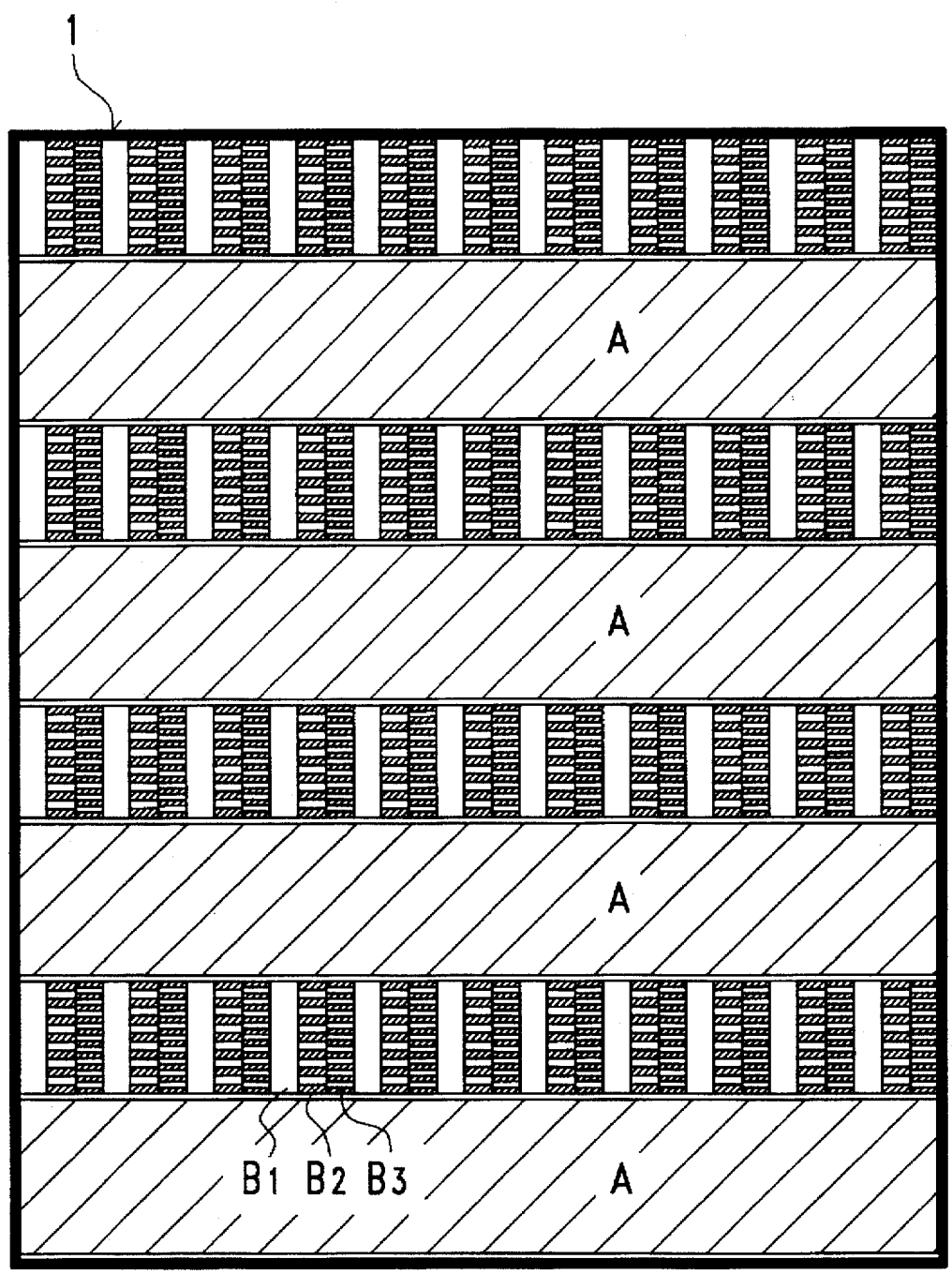
FIG. 3 is a front view of a scanning grating of the position measuring system according to a preferred embodiment of the present invention.
Figure 4:
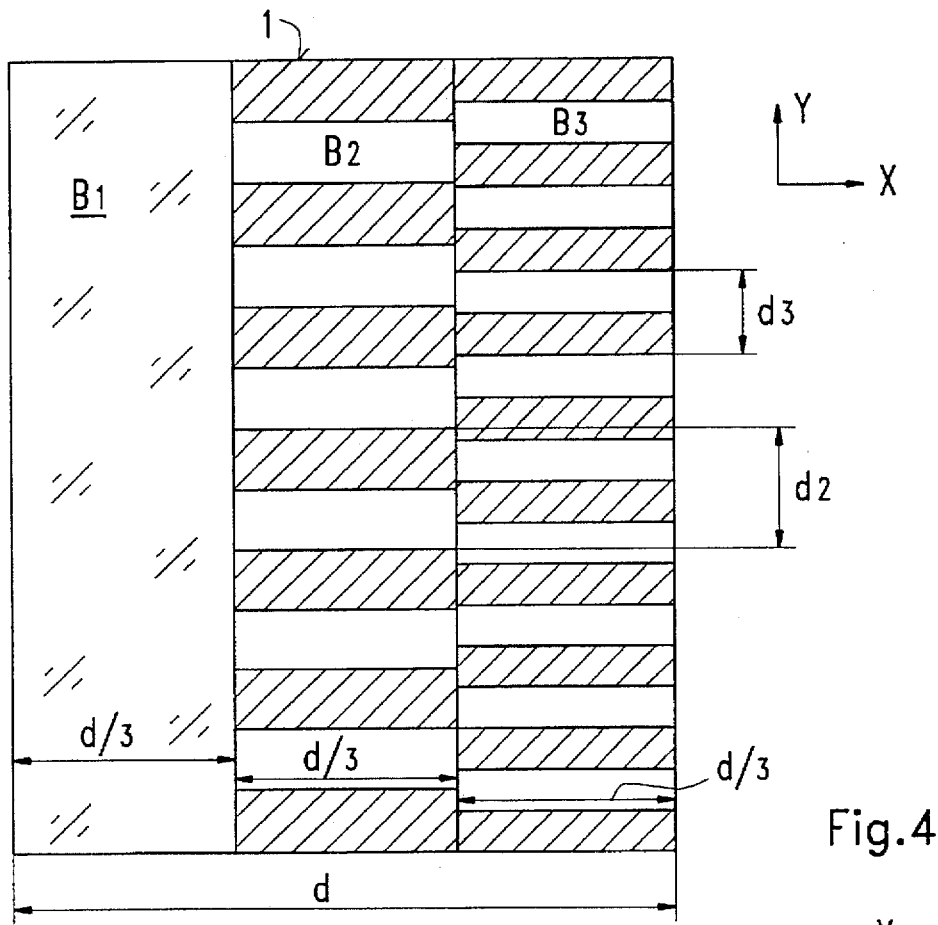
FIG. 4 is a magnified view of portion of the scanning grating of FIG. 3.

FIG. 3 is a front view of a scanning grating of the position measuring system according to a preferred embodiment of the present invention. FIG. 4 is a magnified view of a portion of the scanning grating of FIG. 3.

With reference to FIG. 4 the scanning grating 1 has a plurality of partially transversely structured areas $B_1$, $B_2$, $B_3$ periodically disposed in the measuring direction. Viewed in the measuring direction X, the areas $B_1$, $B_2$, $B_3$ have approximately the same width. The sum of the widths of the first, second and third areas $B_1$, $B_2$, $B_3$, corresponds to the graduation period d of the scanning grid, which can, but need not be identical with the graduation period of a scale grating 2. The width of each area $B_1$, $B_2$, $B_3$ is therefore d/3 in this preferred embodiment.

Figure 5:
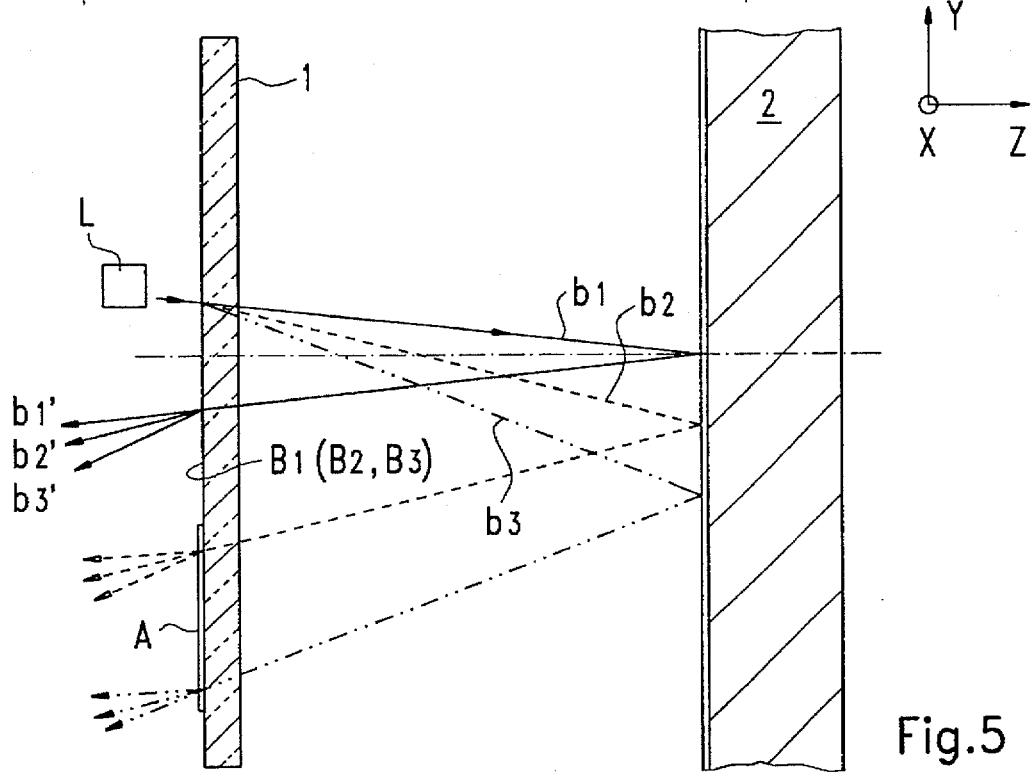
FIG. 5 is a schematic representation of the beam paths inside the position measuring system shown in FIG. 1 employing the scanning grating shown in FIGS. 3 and 4.

The second and third areas $B_2$, $B_3$ consist of gratings arranged transversely with respect to the measuring direction X and having different transverse grating constants $d_2$ and $d_3$ in the Y direction. In this case the graduation lines of the individual gratings are oriented parallel with the measuring direction X. The areas $B_2$ and $B_3$, embodied as transversely blazed phase gratings, furthermore are of such a size or optimized such that the light beams impinging on them are respectively deflected as +1st diffraction orders. As schematically represented in FIG. 5, when a collimated light beam impinges on the scanning grating 1, each one of the transversely differently structured areas $B_2$, $B_3$ deflects the impinging light beam essentially into the +1st transverse diffraction order $b_2$ or $b_3$ respectively. Because of the differently selected grating parameters in the areas $B_2$, $B_3$, a respectively different angular deflection of the diffracted partial light beams takes place. Therefore the respective areas $B_2$, $B_3$ have a different directional selectivity corresponding to their grating constants $d_2$, $d_3$, of the deflected partial light beams.

Figure 2:
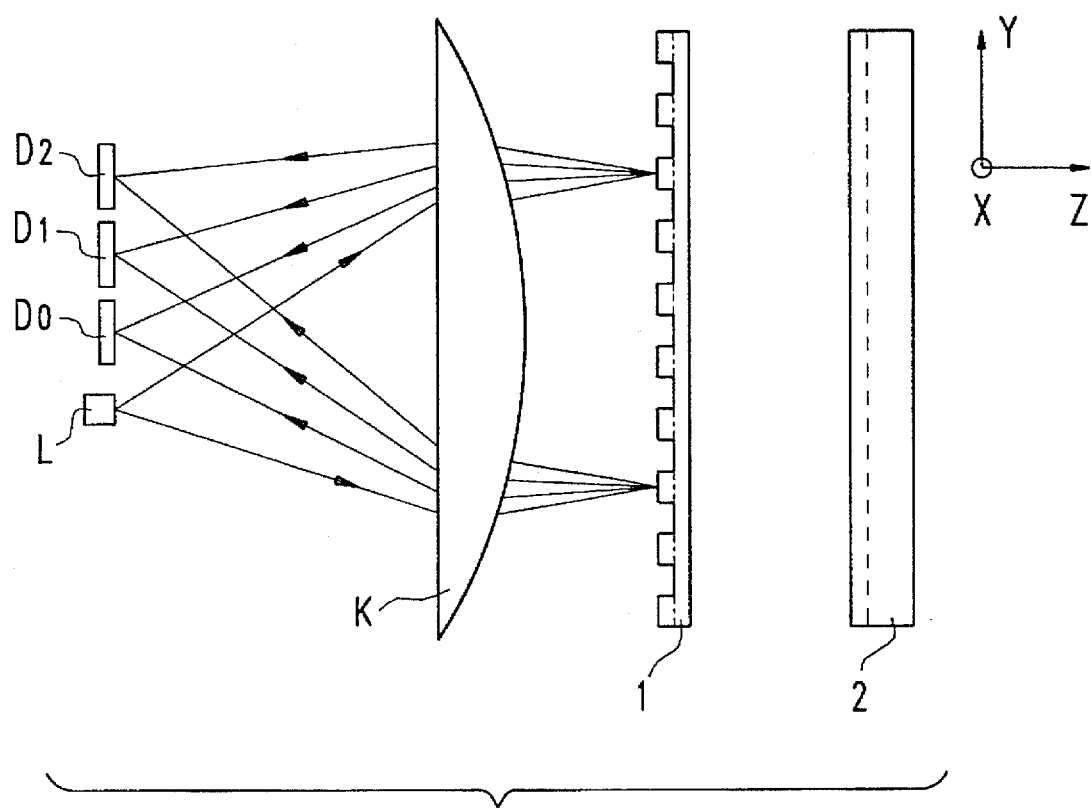
FIG. 2 is a schematic representation of the beam path of the position measuring system shown in FIG. 1 wherein light beams which interfere with each other are used for the generation of position-dependent signals.

Three detectors $D_0$, $D_1$ and $D_2$, embodied as photoelements, are provided on the detector side, which are arranged transversely with respect to the measuring direction X, i.e. in the Y direction. (see FIGS. 1 and 2) Each one of the detectors is associated with one of the three areas $B_1$, $B_2$, $B_3$ and is arranged in the Y direction in such a way that the respective detector is only acted upon by the signal portion coming from the associated area $B_1$, $B_2$, $B_3$.

In a preferred embodiment of the position measuring system according to the present invention the first area $B_1$ is made transparent, i.e. this area $B_1$ lets a light beam $b_1$ pass through without diffraction on the scale grid 2, where it is reflected in accordance with the angle of incidence and again passes through the grating 1. Because of the directionally selective embodiment of the two other areas $B_2$, $B_3$, i.e. the deflection into the +1st diffraction order taking place there, the area $B_1$ also becomes directionally selective with respect to these areas.

Since the light beam $b_1$ reflected by the scale grating 2 is not diffracted in the transverse direction during the second passage through the area $B_1$ of the scanning grating 1, it can be called the resultant 0th diffraction order beam $b_1$. The light portions of the light beam $b_1$ which are transversely deflected during the second passage through the scanning grating 1 by the areas $B_2$ and $B_3$ do not contribute to the resultant and correspondingly detected transverse diffraction order $b_1$.

Thus, the scanning grating 1 acts like an amplitude grating in the direction of the 0th transverse diffraction order. The portion of light registered in the direction of the 0th diffraction order only passes through the area $B_1$, but not through the structured areas $B_2$, $B_3$ of the scanning grating 1. Therefore the scanning structure appears in this detection direction as an amplitude graduation with periodically arranged transparent areas $B_1$ and opaque areas $B_2$, $B_3$.

If the light beams of the area $B_2$, which during the first passage pass through the area $B_1$ of the scanning grating 1 and during the second passage through the scanning grating 1 are deflected in the direction of the +1st transverse diffraction order, are examined, no signal portions are received anymore from the areas $B_1$ and $B_3$ in the direction $b_2$. Only light from the area $B_2$ is detected via the corresponding detector $D_1$. Thus, in this detection direction the scanning structure appears as an amplitude graduation with periodically arranged opaque areas $B_1$, transparent areas $B_2$ and opaque areas $B_3$.

If the light beams of the area $B_3$, which during the first passage pass through the area $B_1$ of the scanning grating 1 and during the second passage through the scanning grating 1 are deflected in the direction of the +1st transverse diffraction order, are examined, no signal portions are received anymore from the areas $B_1$ and $B_2$ in the direction $b_3$, and instead only light from the area $B_3$ is detected via the corresponding detector $D_2$. Thus, in this detection direction the scanning structure appears as an amplitude graduation with periodically arranged opaque areas $B_1$ and $B_2$ and transparent areas $B_3$.

Since the scanning grating 1 has preferably three such areas $B_1$, $B_2$, $B_3$ per graduation period d, it acts as an amplitude grating in each individual one of the transverse diffraction directions or detection directions. The ratio of the transparent areas to the graduation period is respectively $t=\frac{1}{3}$.

Since, in the preferred embodiment illustrated, each graduation period has three areas of equal width, a graduation period of 360° is divided into equal portions of 120° each. This causes a phase shift of respectively 120° between the signals obtained from the different areas. In the preferred embodiment of the present invention shown, the area $B_1$ provides the 0° signal, the areas $B_2$ and $B_3$ the +120° and −120° signals.

If a graduation period were divided into four areas of equal width, each of which causes angularly different deflections in the direction toward associated detectors, it would be possible in an analogous manner to detect four signals in the four transverse deflection directions, which would respectively have a phase shift of 90° with respect to each other. Thus it would be possible, for instance, to provide four areas of equal width. Of these, two areas could be designed analogous with the two areas $B_2$ and $B_3$. Two other areas $B_{2'}$ and $B_{3'}$ (not shown) are disposed offset by 180° and are dimensioned such, that a deflection into the −1st diffraction direction results.

In an amplitude scanning grating according to the present invention the resulting longitudinal diffraction directions are superimposed on each other in phase in contrast to a scanning grating designed as a phase grating. Thus it is possible to add together several longitudinal diffraction directions with one detector and still assure a sufficiently high degree of modulation. Therefore the graduation period of the scanned scale can be selected to be relatively coarse in spite of a short focal length of the condenser.

The beam path in the described preferred embodiment is schematically illustrated in FIG. 5. In this case the scanning grating 1 as well as the graduation grating 2 are partially visible.

In the course of the first passage through the scanning grating 1, the beams $b_1$, $b_2$, $b_3$ from the corresponding areas $B_1$, $B_2$, $B_3$ of the scanning grating 1 are generated. After reflection and diffraction at the graduation grating 2 have taken place, because of the deflection by the transversely structured areas $B_2$ and $B_3$, the beams $b_2$ and $b_3$ impact the scanning grating 1 at places which are spatially separated from each other. These places are also spatially separated from the second impact point of the beam $b_1$ on the scanning grating 1. A renewed deflection in three different spatial directions takes place at the different impact points of the respective beams $b_1$, $b_2$, $b_3$ on the scanning grating 1. Therefore beam portions which, during the first passage, originally passed through different areas $B_1$, $B_2$, $B_3$ and during the second passage through the scanning grating 1 were also deflected at different points, would travel in the direction of the detectors. In this case it would not be assured that only the signal portions with the desired phase position with respect to each other would impinge on each one of the three detectors. Instead, an incoherent superimposition of signal portions of different phase would occur such that the desired phase separation on the detectors would no longer be possible.

However, for evaluation it is provided that the three detectors provide output signals which are each phase-shifted by 120°, i.e. a 0° signal, a +120° signal and a −120° signal. To assure this it is therefore advantageous to superimpose on the scanning grating 1 an amplitude structure A in the Y-direction in such a way that only the interference signals $b_{1'}$, $b_{2'}$, $b_{3'}$ contribute to obtaining the scanning signals which pass through a single area of the scanning grating 1 during the first passage. In the representation of FIG. 1 the amplitude structure A was selected such that only those beams are detected, which have passed through the transparent area $B_1$ during the first passage. Thus, the partial beams indicated by broken lines in the lower part of FIG. 5 are screened out by means of the selected amplitude structure A. The amplitude structure A can therefore be generally considered as a screen which screens out undesired signal portions. In contrast to the preferred embodiment described, in this case dimensioning of the amplitude structure is possible such that in the end only signal portions reach the detectors, which passed through the second area during the first passage through the scanning grating, etc.

As can be seen from the exemplary embodiment of the scanning grating in FIG. 3, the amplitude structure is also periodically designed in the Y-direction, i.e. transversely to the measuring direction X. The areas of the scanning grating indicated by A have been made non-transparent or absorbing and are arranged with respect to each other in such a way that only those partial beams reach the detectors which during the first passage through the scanning grating had been deflected by a single one of the directionally selective areas.

The portion of the scanning grating 1 shown in FIG. 1 therefore shows only one strip of the diffraction structure represented in FIG. 3 and an adjacent screening strip A.

In another preferred embodiment of the present invention the area $B_1$ can also be designed as a transversely blazed grating, whose parameters, however, differ from those of the gratings in the areas $B_2$ and $B_3$. It is therefore not at all compulsory for one of the directionally selective acting areas to be transparent, it is merely important that the different areas have different direction selectivities.

For optimizing the imaging of the diffraction orders on the detectors it is furthermore possible to vary the grating constants of the areas provided with transverse gratings in the transverse direction as a function of location.

Thus, in addition to the preferred embodiments shown, a number of further possibilities for designing the instant invention result. In connection with this it should be pointed out, for example, that the position measuring system in accordance with the present invention can also be realized in a transmitted light arrangement, in this case a first scanning grating, a scale grating and a further union grating are provided. Therefore the scanning grating in this embodiment would have to be designed in accordance with the preferred invention, i.e. to be built with the above described directionally selective transverse structures.

What is claimed is:

1. A photoelectric position measuring system wherein light from a light source is modulated as a function of position by a plurality of gratings, which can be displaced in the measuring direction relative to one another, wherein light beams are diffracted on at least one of the gratings and interfere with each other where a plurality of photo-detectors are provided for detecting position-dependent signals which are phase-shifted with respect to each other, the measuring system comprising:

at least one of the gratings having at least three areas within each one of its graduation periods (d) oriented in the measuring direction (X) the areas disposed behind each other in the measuring direction and essentially extending perpendicularly with respect to the measuring direction, wherein each one of these areas has different directionally selective properties, and that each signal light beam deflected from these areas impacts an associated photo-detector, wherein the photo-detectors are disposed essentially transversely with respect to the measuring direction.

2. The photoelectric position measuring system according to claim 1, wherein at least two areas are embodied as blazed phase gratings which are arranged transversely with respect to the measuring direction.

3. The photoelectric position measuring system according to claim 1, wherein at least two areas respectively form a phase grating oriented transversely with respect to the measuring direction, whose parameters have been selected such that the 0th diffraction order is suppressed.

4. The photoelectric position measuring system according to claim 1, wherein the at least three areas are of identical width in the measuring direction and are arranged inside one graduation period of the grating, and one of the areas is transparent area, and a first photo-detector for detecting the partial light beams from the area and a second photo-detector for detecting the partial light beams from the area are provided, and that the signals of the two photo-detectors are phase-shifted by 120° with respect to each other, wherein the partial light beams from the transparent area are directed on a third photo-detector whose output signal also has a phase shift of 120° in respect to the two above mentioned signals.

5. The photoelectric position measuring system according to claim 4, wherein the grating constants of the grating areas vary in the transverse direction with respect to the measuring direction as a function of position.

6. The photoelectric position measuring system according to claim 1, wherein the light from the light source, collimated by means of a lens, impacts on a scanning grating with different areas, that downstream of the scanning grating a scale grating is provided and that transmitted partial light beams are focused on the scale grating via a union grating by means of a further lens on a plurality of photo-detectors, wherein the scanning grating is embodied in accordance with one of the previous claims.

7. The photoelectric position measuring system according to claim 1, wherein the light from the light source, collimated by means of a lens, impacts on a scanning grating with areas, that a reflecting scale grating is provided downstream of the scanning grating and the reflected partial light beams are again diffracted by the scanning grating and are focused on a plurality of photo-detectors by means of the lens, wherein the scanning grating is embodied in accordance with one of the previous claims.

8. The photoelectric position measuring system according to claim 6 or 7, wherein the scale grating and the scanning grating have the same graduation period in the measuring direction.

9. The photoelectric position measuring system accordance to claim 6 or 7, wherein the scale grating is a phase grating.

10. The photoelectric position measuring system according to claim 1, wherein the scanning grating supports a screen-like amplitude structure, which is oriented transversely to the scanning direction, for screening out undesired signal portions.

11. The photoelectric position measuring system according to claim 10, wherein the amplitude structure is embodied in such a way that on the detector side only those signal portions can be detected which pass through a single one of the areas during the first passage of the impacting light beams, while the signal portions passing through the other areas are screened out.

12. The photoelectric position measuring system according to claim 2, wherein all areas within a graduation period are embodied as blazed phase gratings which are oriented transversely in respect to the measuring direction.

13. A photoelectric position measuring system wherein light from a light source is modulated as a function of position by a plurality of gratings, which can be displaced in the measuring direction relative to one another, wherein light beams are diffracted on at least one of the gratings and interfere with each other where a plurality of photo-detectors are provided for detecting position-dependent signals which are phase-shifted with respect to each other, the measuring system comprising:

at least one of the gratings having at least three areas within each one of its graduation periods (d) oriented in the measuring direction (X) the areas disposed behind each other in the measuring direction and essentially extending perpendicularly with respect to the measuring direction, wherein each one of these areas has different directionally selective properties, and that each signal light beam deflected from these areas impacts an associated photo-detector, wherein the photo-detectors are disposed essentially transversely with respect to the measuring direction, wherein the scanning grating supports a screen-like amplitude structure, which is oriented transversely to the scanning direction, for screening out undesired signal portions.

14. The photoelectric position measuring system according to claim 13, wherein the amplitude structure is embodied in such a way that on the detector side only those signal portions can be detected which pass through a single one of the areas during the first passage of the impacting light beams, while the signal portions passing through the other areas are screened out.

* * * * *

UNITED STATES PATENT AND TRADEMARK OFFICE
CERTIFICATE OF CORRECTION

PATENT NO. : 5,689,336
DATED : November 18, 1997
INVENTOR(S) : Walter Huber

It is certified that error appears in the above-identified patent and that said Letters Patent is hereby corrected as shown below:

In the Claims

In claim 9, line 1, change "accordance" to --according--.

Signed and Sealed this

Twenty-first Day of March, 2000

Attest:

Attesting Officer

Q. TODD DICKINSON

Commissioner of Patents and Trademarks